(12) United States Patent
Gibbs

(10) Patent No.: US 8,348,314 B2
(45) Date of Patent: Jan. 8, 2013

(54) GIBBS' BUMPER GUARD

(76) Inventor: Garfield Gibbs, Fayetteville, NC (US)

( * ) Notice: Subject to any disclaimer, the term of this patent is extended or adjusted under 35 U.S.C. 154(b) by 234 days.

(21) Appl. No.: 12/931,132

(22) Filed: Jan. 25, 2011

(65) Prior Publication Data

US 2012/0187704 A1 Jul. 26, 2012

(51) Int. Cl.
B60R 19/24 (2006.01)
(52) U.S. Cl. .................................................. 293/142
(58) Field of Classification Search ............... 293/142, 293/102, 115, 117, 120, 155, 118
See application file for complete search history.

(56) References Cited

U.S. PATENT DOCUMENTS

| | | | | | |
|---|---|---|---|---|---|
| 2,062,313 | A | * | 12/1936 | Jandus et al. | 293/143 |
| 2,093,740 | A | * | 9/1937 | Schulman | 224/486 |
| 2,146,801 | A | * | 2/1939 | De Orlow | 293/145 |
| 3,097,725 | A | * | 7/1963 | Peterson | 188/268 |
| 3,361,467 | A | * | 1/1968 | Ludwikowski | 293/136 |
| 3,879,075 | A | * | 4/1975 | Hale | 293/142 |
| 4,202,562 | A | * | 5/1980 | Sorenson | 280/415.1 |
| 5,167,423 | A | * | 12/1992 | Hall, Jr. | 280/486 |
| 5,397,147 | A | * | 3/1995 | Ducharme et al. | 280/415.1 |
| 5,727,805 | A | * | 3/1998 | La Roque | 280/478.1 |
| 5,833,254 | A | * | 11/1998 | Bucho | 280/154 |
| 5,941,550 | A | * | 8/1999 | Szczypski | 280/479.2 |
| 6,412,806 | B1 | * | 7/2002 | Peacock | 280/507 |
| 6,443,345 | B1 | * | 9/2002 | Bloemer et al. | 224/519 |
| 6,874,804 | B2 | * | 4/2005 | Reese et al. | 280/477 |
| 6,913,277 | B2 | * | 7/2005 | Mrofka et al. | 280/491.5 |
| 6,942,252 | B2 | * | 9/2005 | Buuck et al. | 280/847 |
| 7,258,359 | B2 | * | 8/2007 | Wooten | 280/491.5 |
| 7,793,967 | B2 | * | 9/2010 | McConnell | 280/491.1 |
| 7,967,336 | B2 | * | 6/2011 | Biseli | 280/769 |
| 8,182,023 | B2 | * | 5/2012 | Nagwanshi et al. | 296/187.09 |
| 8,226,107 | B2 | * | 7/2012 | Columbia | 280/511 |
| 8,256,790 | B2 | * | 9/2012 | Fortner | 280/478.1 |
| 2002/0008363 | A1 | * | 1/2002 | Chadwick | 280/504 |
| 2010/0007116 | A1 | * | 1/2010 | Columbia | 280/511 |
| 2010/0044999 | A1 | * | 2/2010 | Columbia | 280/511 |
| 2010/0084449 | A1 | * | 4/2010 | Columbia | 224/520 |

* cited by examiner

*Primary Examiner* — Kiran B Patel
(74) *Attorney, Agent, or Firm* — Aleksandr Smushkovich

(57) ABSTRACT

There is disclosed a bumper guard device for a vehicle having a hitch mount, the device includes—a bumper guard bar, —a support member having a first and second ends, the first end is fixedly attached to the bumper guard bar, —a housing including a rear movable wall and a front wall attached to the hitch mount, —a plurality of bolts attached to the front wall, and—a plurality of springs. Each spring has an immovable end, put on the corresponding bolt, and a movable end, attached to the rear wall, while the rear wall is fixedly attached to the second end of the support member. The rear wall can preferably move within 1 inch. The plurality of bolts and springs preferably constitutes four elements. The bumper guard device efficiently cushions the external impacts caused by other vehicles or obstacles.

2 Claims, 3 Drawing Sheets

GIBBS' BUMPER GUARD

FIELD OF THE INVENTION

The present invention relates to bumper guard devices used to prevent minor damages to the rear of a vehicle.

BACKGROUND OF THE INVENTION

Though the related art contains numerous designs of bumper guard devices for protection of the rear bumper of a motor vehicle, many of them possess certain disadvantages, such as narrow usage for bumpers of a particular style, inadequate protection, difficulties in mounting, insufficient elasticity, etc.

For example, there is known U.S. Pat. No. 3,563,595 to Slavney that teaches: "A bumper guard for motor vehicles having a rigid, channel-shaped, base plate imbedded in and bonded to a resilient cushioning member. The base plate has a substantially vertical elongate slot with an enlarged end and the resilient cushioning member has a groove in the rear face thereof communicating with the slot for receiving the head of a mounting bolt for securing the guard to the bumper of a vehicle at the desired elevation." The mentioned device absorbs the impact energy only when the other vehicle immediately touches the device itself, not the whole bumper guard, which provides for insufficient protection.

BRIEF SUMMARY OF THE INVENTION

The present invention (herein also called 'Gibbs' Bumper Guard') allows for cushioning an impact caused to a vehicle by an external impact, applied, for example, by a bumper of another vehicle, by an obstacle (e.g. a tree), etc., thereby preventing minor damages to the vehicle.

Gibbs' Bumper Guard is a bumper guard device for a vehicle having a hitch mount; the device comprises: —a bumper guard bar; —a support member, having a first and second ends, the first end is fixedly attached to the bumper guard bar; —a housing including: a rear movable wall and a front wall attached to the hitch mount; —a plurality of bolts attached to the front wall; and —a plurality of springs. Each of the springs has an immovable end, put on the corresponding bolt, and a movable end, attached to the rear wall, while the rear wall is fixedly attached to the second end of the support member. The rear wall can preferably move within 1 inch. The plurality of bolts and springs preferably constitutes four elements.

BRIEF DESCRIPTION OF DRAWINGS

Identical reference numerals on the drawings refer to the same elements on different figures. A newly introduced numeral in the description is enclosed into parentheses.

A SAMPLE PREFERRED EMBODIMENT OF THE PRESENT INVENTION

Figure 1:
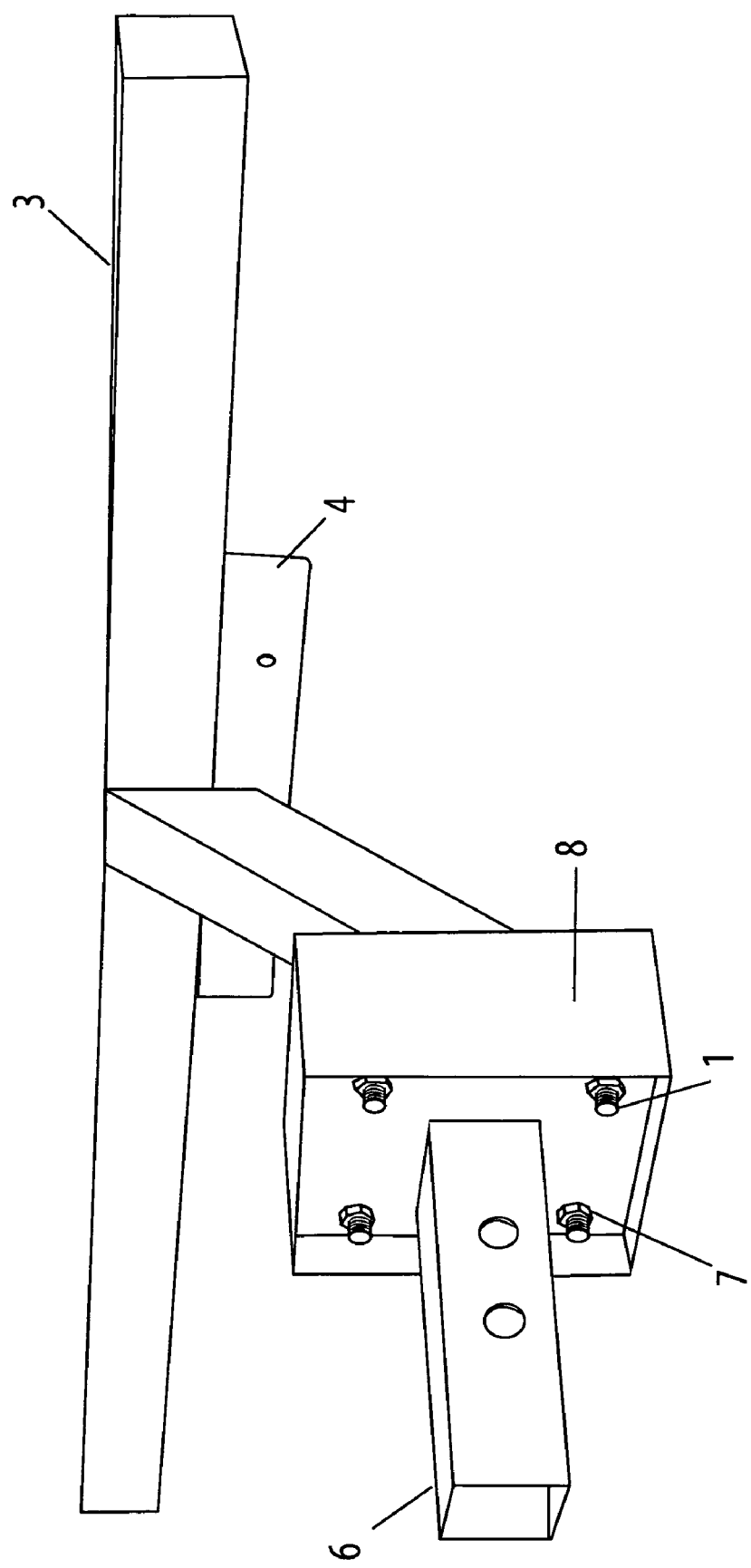
FIG. 1 illustrates a general view of the bumper guard with the hitch mount of a vehicle in the assembled state, according to an embodiment of the present invention.

While the invention may be susceptible to embodiment in different forms, there is shown in the drawings, and will be described in detail herein, a specific embodiment of the present invention, with the understanding that the present disclosure is to be considered an exemplification of the principles of the invention, and is not intended to limit the invention to that as illustrated and described herein.

Figure 2:
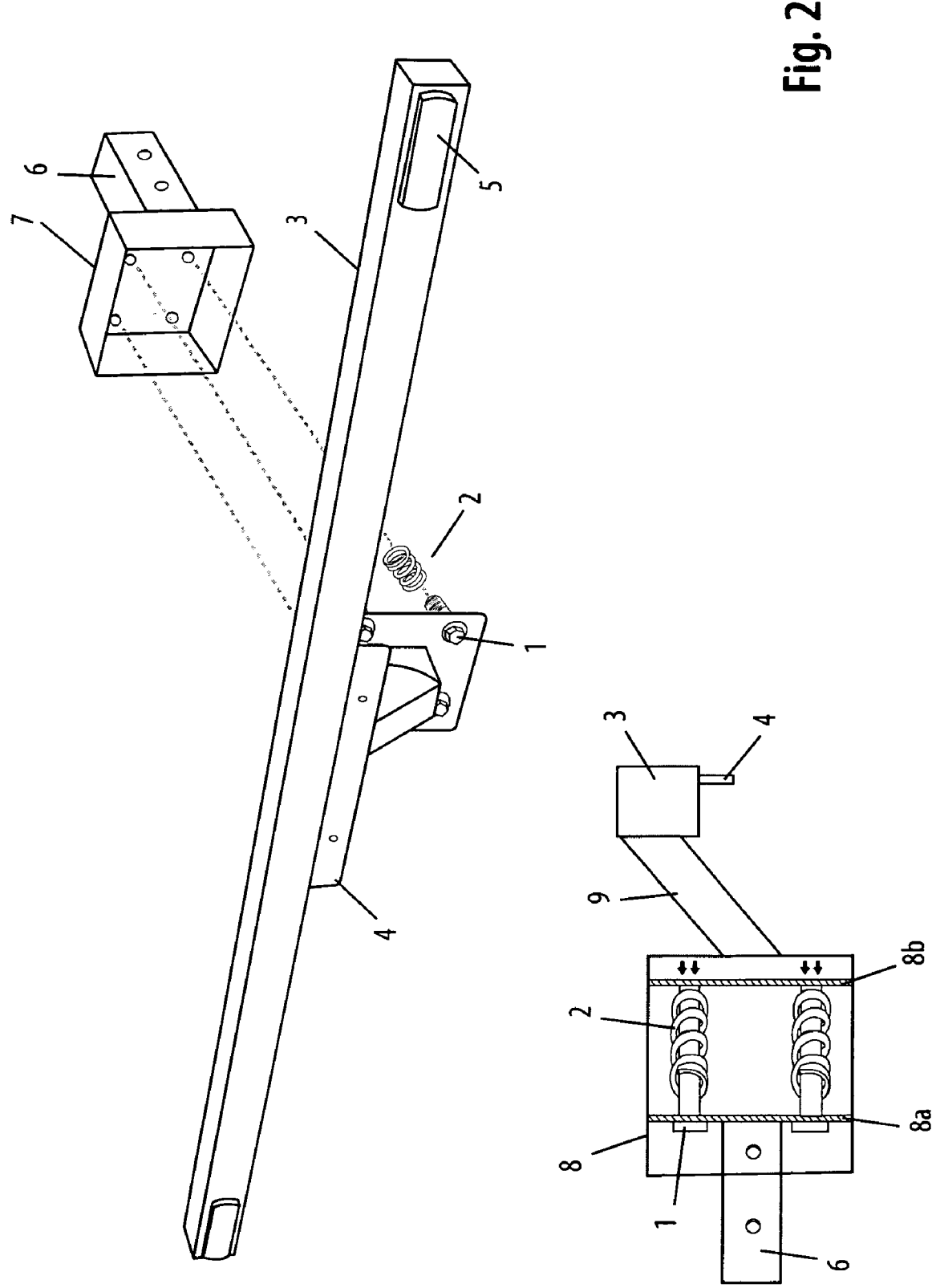
FIG. 2 illustrates a general view of the bumper guard with the hitch mount of a vehicle in the dissembled state, according to an embodiment of the present invention.
Figure 3:
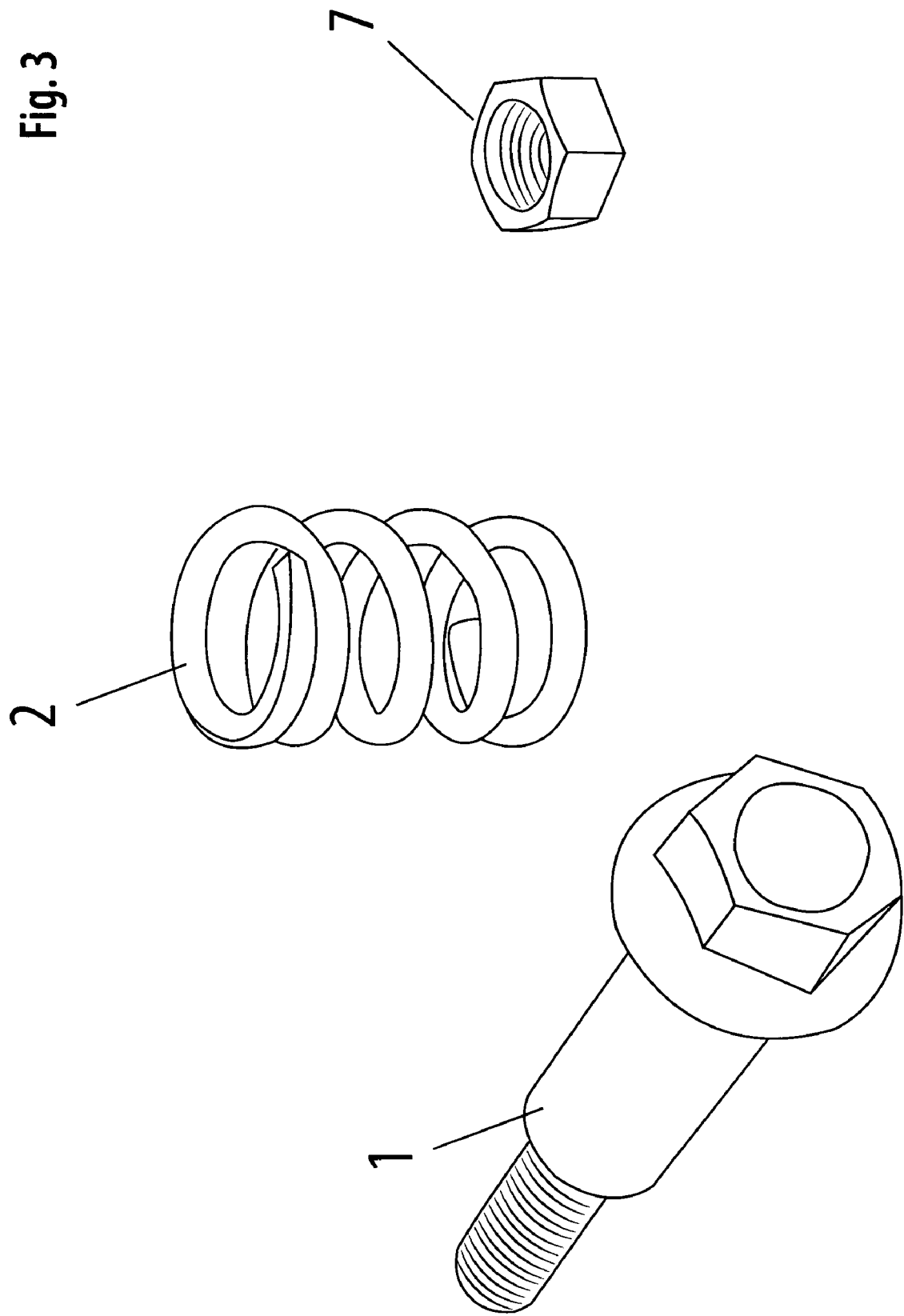
FIG. 3 illustrates a view of some parts of the bumper guard, according to an embodiment of the present invention.

A preferred embodiment of the invention is illustrated on FIGS. 1, 2, and 3.

The inventive device is designed for a vehicle having a hitch mount (6). The device comprises: a bumper guard bar (3); an angular support member (9) having a first end and a second end, the first end of support member 9 is fixedly attached to the bumper guard bar 3; a housing (8) including: a rear wall (8a) movable inside the housing within a predetermined range, and a front wall (8b) attached to the hitch mount 6, a plurality of bolts (1) attached to the front wall with nuts (7), and a plurality of springs (2), wherein each spring 2 has an immovable end put on the corresponding bolt 1, and a movable end attached to the rear wall 9, and wherein the rear wall 8a is fixedly attached to the second end of support member 9.

The preferable range of movement (linear displacement) of the rear wall 8b is about 1 inch. The preferable number of the bolts 1, the nuts 7, and the springs 2 is four, as shown on FIGS. 1 and 2. The bumper guard bar 3 is typically supplied with reflectors (5), and with a license plate holder (4), as shown on FIG. 2.

During operation, an external impact is applied to the bumper guard bar 3, which impact is conveyed through the support member 9 to the rear wall 8b that causes contraction of the springs 2. The springs 2 have a predetermined level of elasticity that allows for partial cushioning the impact. Thus only a portion of the impact is conveyed to the immovable front wall 8a and to the hitch mount 6, which may prevent minor damages to the vehicle.

Those skilled in the art will appreciate that the conception, upon which this disclosure is based, may readily be utilized as a basis for the designing of other structures, methods, and systems, for carrying out several purposes of the present invention. It is therefore important that the claims be regarded as including such equivalent constructions insofar as they do not depart from the spirit and scope of the present invention. As opposed to the claims, the foregoing abstract is neither intended to define the invention of the instant application, which is measured by the claims, nor is it intended to be limiting as to the scope of the invention in any way.

I claim:

1. A bumper guard device for a vehicle having a hitch mount, said device comprises:
    a bumper guard bar;
    a support member, having a first end and a second end, the first end of said support member is fixedly attached to the bumper guard bar;
    a housing including:
        a rear wall linearly movable inside said housing within a predetermined displacement range, and
        a front wall attached to said hitch mount;
    a plurality of bolts attached to the front wall, and
    a plurality of springs;
    wherein each said spring has an immovable end, put on the corresponding bolt, and a movable end, attached to the rear wall, and wherein the rear wall is fixedly attached to the second end of said support member.

2. The bumper guard device according to claim 1, wherein: said plurality of bolts constitutes four, said plurality of springs constitutes four, and said predetermined displacement range essentially constitutes one inch.

* * * * *